US 11,987,130 B2
(12) United States Patent
Clowes et al.

(10) Patent No.: US 11,987,130 B2
(45) Date of Patent: May 21, 2024

(54) WORKING MACHINE

(71) Applicant: J.C. BAMFORD EXCAVATORS LIMITED, Uttoxeter (GB)

(72) Inventors: Matthew James Clowes, Uttoxeter (GB); Neil Beloe, Uttoxeter (GB); Alex Kay, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 631 days.

(21) Appl. No.: 16/937,571

(22) Filed: Jul. 23, 2020

(65) Prior Publication Data

US 2021/0023950 A1 Jan. 28, 2021

(30) Foreign Application Priority Data

Jul. 23, 2019 (GB) ...................................... 1910496

(51) Int. Cl.
*B60L 1/00* (2006.01)
*B60H 1/00* (2006.01)
(Continued)

(52) U.S. Cl.
CPC .......... *B60L 1/003* (2013.01); *B60H 1/00007* (2013.01); *B60H 1/00278* (2013.01);
(Continued)

(58) Field of Classification Search
CPC ............. F15B 21/0423; F15B 21/0727; B60H 1/00007; B60H 1/03; B60H 1/22; B60H 1/00271; B60H 1/00378; B60H 2001/00307; B60H 1/00278; B60H 1/32281; B60H 1/323; E02F 9/2278; E02F 9/16; B60L 2240/36; B60L 2200/40; B60L 2200/42; B60L 2200/44; B60L 58/27; B66F 9/22; B66C 13/54; B60Y 2200/41;
(Continued)

(56) References Cited

U.S. PATENT DOCUMENTS 5,318,100 A * 6/1994 Aoki ................... B60H 1/00007
237/12.3 A
5,697,546 A * 12/1997 Cicioni .............. B60H 1/00321
228/183

(Continued)

FOREIGN PATENT DOCUMENTS

CN 205895776 U 1/2017
CN 106480921 A 3/2017
(Continued)

OTHER PUBLICATIONS

EP 2774789 A1 English Machine Translation (Year: 2014).*
(Continued)

*Primary Examiner* — Jenna M Hopkins
(74) *Attorney, Agent, or Firm* — MARSHALL, GERSTEIN & BORUN LLP

(57) ABSTRACT

A working machine comprising a hydraulic fluid circuit an operator structure and a thermal management system. The thermal management system connects an operator structure heater and a heat exchanger arranged to selectively remove heat energy from the hydraulic fluid circuit, so as to be capable transferring heat from the hydraulic fluid to the operator structure.

21 Claims, 10 Drawing Sheets

(51) Int. Cl.

| | |
|---|---|
| *B60H 1/03* | (2006.01) |
| *B60H 1/22* | (2006.01) |
| *B60H 1/32* | (2006.01) |
| *B60L 50/60* | (2019.01) |
| *E02F 9/20* | (2006.01) |
| *E02F 9/22* | (2006.01) |
| *F15B 21/0423* | (2019.01) |
| *F15B 21/0427* | (2019.01) |
| *F15B 21/04* | (2019.01) |

(52) U.S. Cl.
CPC ..... *B60H 1/00378* (2013.01); *B60H 1/00392* (2013.01); *B60H 1/0075* (2013.01); *B60H 1/03* (2013.01); *B60H 1/2218* (2013.01); *B60H 1/2221* (2013.01); *B60H 1/3227* (2013.01); *B60L 50/60* (2019.02); *E02F 9/207* (2013.01); *E02F 9/2075* (2013.01); *E02F 9/2095* (2013.01); *E02F 9/226* (2013.01); *E02F 9/2278* (2013.01); *F15B 21/0423* (2019.01); *F15B 21/0427* (2019.01); *B60Y 2200/41* (2013.01); *F15B 21/04* (2013.01); *Y02T 10/70* (2013.01)

(58) Field of Classification Search
CPC .......... B60Y 2200/415; B60Y 2200/91; F16H 57/0412; F16H 57/0413; F16H 57/0415; F16H 57/0416; F16H 57/0417; B60K 1/00; B60K 11/02; B60K 2001/003; B60K 2001/005; B60K 2001/006; F01P 2007/146; F01P 2060/045; F01P 3/20; H02K 9/19; Y02T 10/70

See application file for complete search history.

(56) References Cited

U.S. PATENT DOCUMENTS

| | | | |
|---|---|---|---|
| 6,758,266 B1 * | 7/2004 | Sjunnesson | B60R 17/02 |
| | | | 165/253 |
| 2017/0297414 A1 | 10/2017 | Beloe | |
| 2018/0320338 A1 | 11/2018 | Osaka et al. | |
| 2019/0039439 A1 * | 2/2019 | Aldridge | B60H 1/00278 |
| 2020/0189357 A1 * | 6/2020 | Chopard | B60H 1/143 |

FOREIGN PATENT DOCUMENTS

| | | | | |
|---|---|---|---|---|
| DE | 102014112632 A1 * | 3/2016 | ......... | B60H 1/00907 |
| EP | 2774789 A1 * | 9/2014 | ......... | B60H 1/00378 |
| JP | 2008236871 A | 10/2008 | | |
| JP | 2009274462 A | 11/2009 | | |
| JP | 5462731 B2 | 4/2014 | | |

OTHER PUBLICATIONS

DE102014112632A1 English Machine Translation (Year: 2016).*
Extended European Search Report for European Patent Application No. 20186804.9, dated Jan. 11, 2021.
Extended European Search Report for European Patent Application No. 20186805.6, dated Jan. 12, 2021.
Search Report for GB 2004772.6, dated Apr. 30, 2020.
Search Report for GB 1910496.7, dated Apr. 29, 2020.

* cited by examiner

WORKING MACHINE

FIELD

The present disclosure relates to a working machine, and a control method for such a working machine.

BACKGROUND

Working machines of various types such as excavators, backhoe loaders, wheel loading shovels, telescopic handlers, tractors and the like used in various applications in construction, agriculture, logistics and waste handling and recycling have historically been powered by internal combustion engines (ICEs), for example diesel engines.

Due to increasing concerns regarding climate change and air quality, legislation has been enacted that is resulting in a drive towards alternative power sources for such machines. One such power source is electrical energy stored in batteries or other storage media that is used to provide energy to electric motors to operate such working machines. The batteries may be used as the sole source of power to the machine, or may be used in conjunction with an ICE in a so called "hybrid" configuration whereby power may be supplied from the battery to the electric motors alone, energy may be supplied from diesel fuel to power an internal combustion engine alone, or some combination of the two power sources may be utilised. In such hybrid configurations, typically a smaller ICE will be provided than on a traditional machine with the power shortfall being supplied from the batteries and electric motor.

Traditional energy sources such as diesel fuel have a greater energy density than batteries, i.e. one unit mass of the fuel is able to supply more energy compared to a unit mass of a battery. Diesel fuel is generally lower cost than batteries or other electrical energy storage media. Batteries also take significantly longer to charge than an ICE engine takes to refuel, potentially leading to a loss of productivity.

In addition, ICEs produce a significant amount of waste heat in operation that may be utilised for heating parts of the working machine as required, such as the operator cabin. Such a source of heat may be reduced in a hybrid working machine, or be entirely non-existent in a solely electrically powered working machine.

During certain stages of a typical operating cycle of a working machine, and being dependent upon environmental conditions, certain parts of a working machine may desirably be heated or cooled to maintain operating efficiency and operator comfort. The supply of energy to effect such heating or cooling may be problematic in certain circumstances in a pure electric working machine or a hybrid working machine in view of the reduced availability or quality of energy and waste heat to provide such heating or cooling. In particular the use of electrical energy from the machine's batteries to provide such heating or cooling may reduce the available energy for such a machine to perform working operations, between periods of charging where the machine may not be operable, thereby compromising the working efficiency of the machine.

The present teachings seek to overcome or at least mitigate the problems of the prior art.

SUMMARY

According to a first aspect of the teachings, a working machine is provided comprising;

a hydraulic fluid circuit arranged to provide hydraulic fluid to one or more hydraulic actuators to perform a working operation such as displacing a working arm;
a ground engaging propulsion structure;
an electrical energy storage device configured to provide, electrical energy to an electric motor to provide, at least in part, tractive power to the ground engaging propulsion structure and/or power to a hydraulic pump to provide pressurised hydraulic fluid to displace the or each hydraulic actuator;
an operator structure;
an operator structure heater and/or cooler arranged to provide and/or remove heat energy to selectively warm and/or cool the operator structure and/or a device to direct excess heat energy to atmosphere and/or liberate heat energy from atmosphere;
a heat exchanger arranged to selectively remove or supply heat energy from or to the hydraulic fluid circuit; and
a thermal management system connecting the heat exchanger to the operator structure heater and/or cooler and/or the device to direct excess heat energy to atmosphere and/or liberate heat energy from atmosphere to transfer heat from and/or to the hydraulic fluid to the operator structure heater/cooler and/or the atmosphere.

Advantageously, this arrangement enables excess heat energy in the hydraulic fluid to be used to heat the operator structure and/or vice versa and/or utilise the ambient atmosphere otherwise, with less requirement for electrical energy to be used to provide the heating.

In exemplary embodiments, the thermal management system comprises a hydraulic fluid heat exchanger immersed in the hydraulic fluid. This is an efficient way of enabling the heat transfer.

In exemplary embodiments, the hydraulic fluid heat exchanger is a liquid/liquid heat exchanger. This arrangement further increases the efficiency.

In exemplary embodiments, the operator structure heater is a liquid/gas heat exchanger.

In exemplary embodiments, the thermal management system is further arranged to supply heat energy to and/or remove heat energy from at least one of: an electric motor to provide tractive power to the ground engaging structure, an electric motor to drive a hydraulic pump of the hydraulic fluid circuit, power electronics of the working machine; and the electrical energy storage device.

This arrangement may further optimise the usage of heat energy in the working machine.

In exemplary embodiments, the working machine further comprises a hydraulic fluid heater arranged so as to supply heat energy to the hydraulic fluid.

In exemplary embodiments, the working machine further comprises an electric heater arranged to supply heat energy to the thermal management system.

This may enable the pre-conditioning of the hydraulic fluid and/or operator structure to occur prior to operation of the working machine.

In exemplary embodiments, the working machine further comprises a device to direct excess heat energy to atmosphere and/or liberate heat energy from atmosphere.

This device enables excess heat energy beyond that useable within the working machine to be dissipated.

In exemplary embodiments, the device comprises an outside air heat exchanger.

In exemplary embodiments, the thermal management system comprises a heat pump circuit optionally including a compressor, an expansion device, an evaporator and a condenser.

The provision of a heat pump allows heat transfer to occur more efficiently in certain conditions.

In exemplary embodiments, the thermal management system comprises a selectable cooling circuit connected to the evaporator.

In exemplary embodiments, the thermal management system comprises a selectable heating circuit connected to the condenser.

In exemplary embodiments, the working machine further comprises a valve arranged in the cooling and heating circuits to selectively switch between operator structure heating and operator structure cooling.

In exemplary embodiments, the working machine further comprises a valve arranged in the cooling and heating circuits to selectively switch between hydraulic fluid heating and hydraulic fluid cooling.

In exemplary embodiments, the working machine further comprises an outside air heat exchanger and further comprising a valve arranged in the cooling and heating circuits to selectively switch the outside heat exchanger between heat energy absorption and heat energy rejection.

According to a second aspect of the teachings, a method of controlling the temperature of hydraulic fluid in the hydraulic fluid circuit of the working machine of the first aspect of the teachings is provided, the method comprising the steps of:

a) determining an actual temperature of the hydraulic fluid;
b) comparing the actual temperature to a target temperature; and
c) if the actual temperature differs from the target temperature utilising the thermal management system to remove or supply heat energy from or to the hydraulic fluid.

This ensures that the hydraulic fluid is operating at a temperature where it does not cause damage to components in the hydraulic fluid circuit.

In exemplary embodiments, the method comprises the further step of the actual temperature is below the target temperature utilising the thermal management system to supply heat energy to the hydraulic fluid.

This method helps ensure that the hydraulic fluid is operating at an optimal viscosity to increase the efficiency of the working operations and thereby maximise the operations that may be undertaken between recharging operations of the electrical energy storage device.

In exemplary embodiments, in step c) the heat energy is transferred to the operator structure heater.

This means that the overall efficiency of the machine is further improved since less electrical energy is used to effect operator structure heating.

In exemplary embodiments, in step c) the heat energy is transferred to the outside atmosphere.

In exemplary embodiments, when a cooling demand is received for the operator structure the operator structure heat is selectively transferred to the hydraulic fluid if the hydraulic fluid has actual temperature lower than the target temperature.

This means that the overall efficiency of the machine is improved since less electrical energy is used to effect heating of the hydraulic fluid to achieve an optimal viscosity.

In exemplary embodiments, the target temperature is a temperature range, for example between 40° C. and 60° C.

BRIEF DESCRIPTION OF THE DRAWINGS

Embodiments disclosed herein will now be described, by way of example only, with reference to the accompanying drawings, in which.

DETAILED DESCRIPTION

Figure 1:
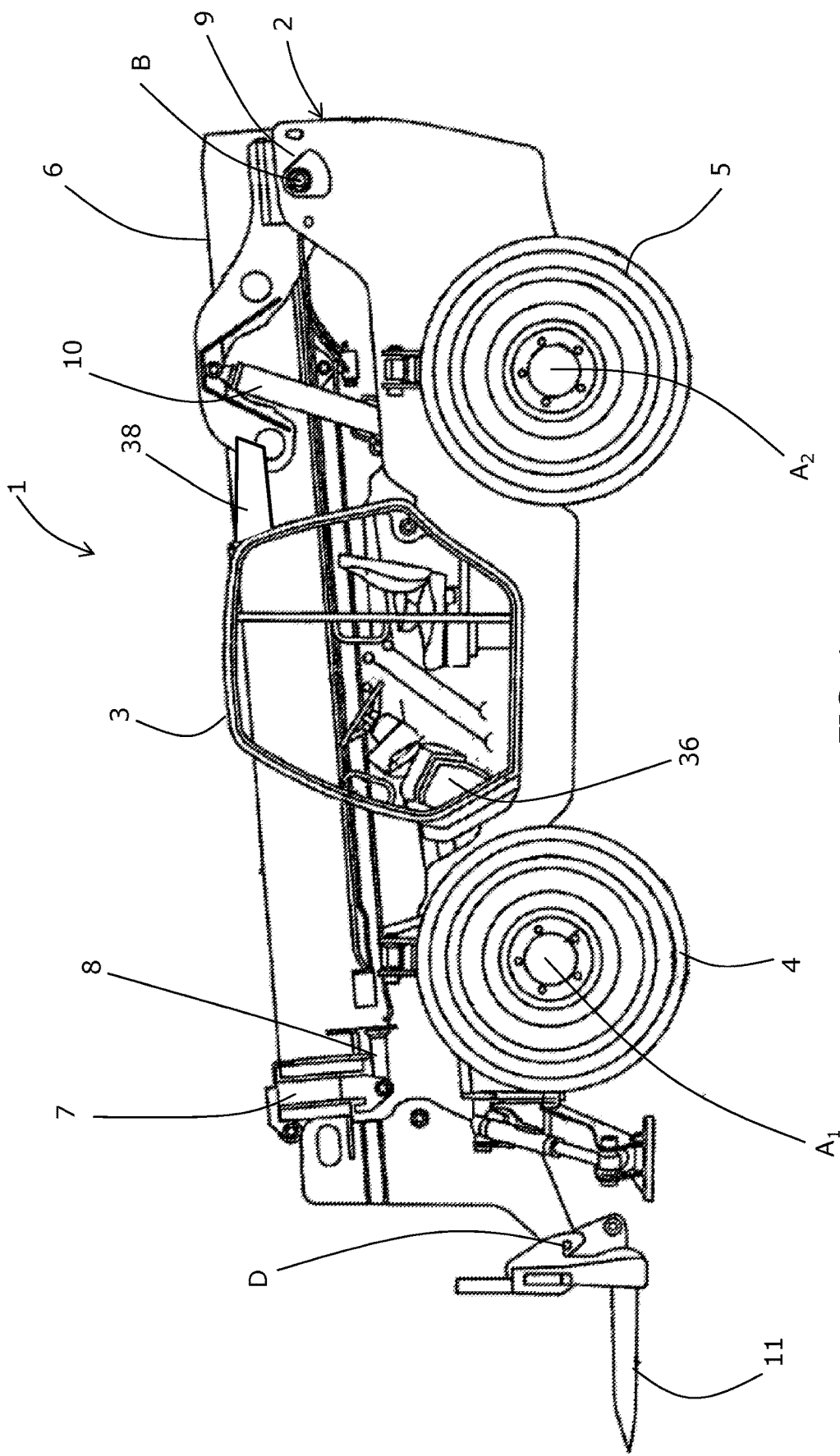
FIG. 1 is a side view of a working machine of an embodiment of the present teachings.

With reference to FIG. 1, an embodiment of the teachings includes a working machine 1 which may be a load handling machine. In this embodiment the load handling machine is a telescopic handler. In other embodiments the working machine 1 may be a skid-steer loader, a compact track loader, a wheel loader, or a telescopic wheel loader, a slew excavator, a backhoe loader, a dumper or a tractor for example. Such machines may generally be denoted as off-highway working machines. All such machines include a hydraulic fluid circuit for performing working operations such as moving a working arm of a loader or excavator; tipping a skip of a dumper; or lifting or powering an implement of a tractor. The machine 1 includes a machine body 2 which may include a structure to accommodate a machine operator, for example, an enclosed operator's cab from which an operator can operate the machine 1, the working environment in which can be separate from its surroundings.

In an embodiment, the machine 1 has a ground engaging propulsion structure comprising a first axle A1 and a second axle A2, each axle being coupled to a pair of wheels (two wheels 4, 5 are shown in FIG. 1 with one wheel 4 connected to the first axle A1 and one wheel 5 connected to the second axle A2). The first axle A1 may be a front axle and the second axle A2 may be a rear axle. One or both of the axles A1, A2 may be coupled to a motor M (see FIG. 2 discussed below) which is configured to drive movement of one or both pairs of wheels 4, 5. Thus, the wheels may contact a ground surface H and rotation of the wheels 4, 5 may cause movement of the machine with respect to the ground surface. In other embodiments (not shown) the ground engaging propulsion structure may comprise tracks. In other embodiments (not shown), drive transmission may not be operated by the motor via a direct mechanical linkage, but instead the motor drives a hydraulic pump, which subsequently provides traction via one or more hydraulic motors that are drivingly connected to the wheels or tracks.

In an embodiment, at least one of the first and second axles A1, A2 is coupled to the machine body 2 by a pivot joint (not shown) located at substantially the centre of the axle such that the axle can rock about a longitudinal axis of the machine 1—thus, improving traction and stability of the machine 1 when moving across uneven ground. It will be appreciated that this effect can be achieved in other known manners.

A load handling apparatus 6, 7 is coupled to the machine body 2. The load handling apparatus 6, 7 may be mounted by a mount 9 to the machine body 2. In an embodiment, the load handling apparatus 6, 7 includes a working arm 6, 7.

The working arm 6, 7 may be a telescopic arm having a first section 6 connected to the mount 9 and a second section 7 which is telescopically fitted to the first section 6. In this embodiment, the second section 7 of the working arm 6, 7 is telescopically moveable with respect to the first section 6 such that the working arm 6, 7 can be extended and retracted. Movement of the first section 6 with respect to the second section 7 of the working arm 6, 7 may be achieved by use of an extension actuator 8 which may be a double acting hydraulic linear actuator. One end of the extension actuator 8 is coupled to the first section 6 of the lifting arm 6, 7 and another end of the extension actuator 8 is coupled to the second section 7 of the working arm 6, 7 such that extension of the extension actuator 8 causes extension of the working arm 6, 7 and retraction of the extension actuator 8 causes retraction of the working arm 6, 7. As will be appreciated, the working arm 6, 7 may include a plurality of sections: for example, the working arm 6, 7 may comprise two, three, four or more sections. Each arm section may be telescopically fitted to at least one other section.

The working arm 6, 7 can be moved with respect to the machine body 2 and the movement is preferably, at least in part, rotational movement about the mount 9 (about pivot B of the working arm 6, 7). The rotational movement is about a substantially transverse axis of the machine 1, the pivot B being transversely arranged.

Rotational movement of the working arm 6, 7 with respect to the machine body 2 is, in an embodiment, achieved by use of at least one lifting actuator 10 coupled, at one end, to the first section 6 of the working arm 6, 7 and, at a second end, to the machine body 2. The lifting actuator 10 is a double acting hydraulic linear actuator, but may alternatively be single acting. In some embodiments, the lifting actuator is an electric linear actuator.

A load handling implement 11 may be located at a distal end of the working arm 6, 7. The load handling implement 11 may include a fork-type implement which may be rotatable with respect to the working arm 6, 7 about a pivot D, this pivot also being transversely arranged. Other implements may be fitted such as shovels, grabs etc. Movement of the load handling implement 11 may be achieved by use of a double acting linear hydraulic actuator (not shown) coupled to the load handling implement 11 and the distal end of the section 7 of the working arm 6, 7.

In the illustrated embodiment, the operator cab 3 has a fixed angular orientation with respect to the front and/or rear axles A1 and A2.

With reference to FIG. 1, the working machine 1 further comprises a cabin climate control assembly 36 located in the cabin 3. As discussed in more detail below, the cabin climate control assembly 36 may, dependent on the machine specification and the climate in which it is intended to operate include just a cabin heater or a cabin heater and cabin cooler.

In addition, the working machine 1 of FIG. 1 also includes an outside heat exchange assembly 38 that is mounted to the rear of the cabin 3, and is also discussed in more detail below. In other embodiments the outside heat exchanger may be mounted in other location on the working machine 1.

Figure 2:
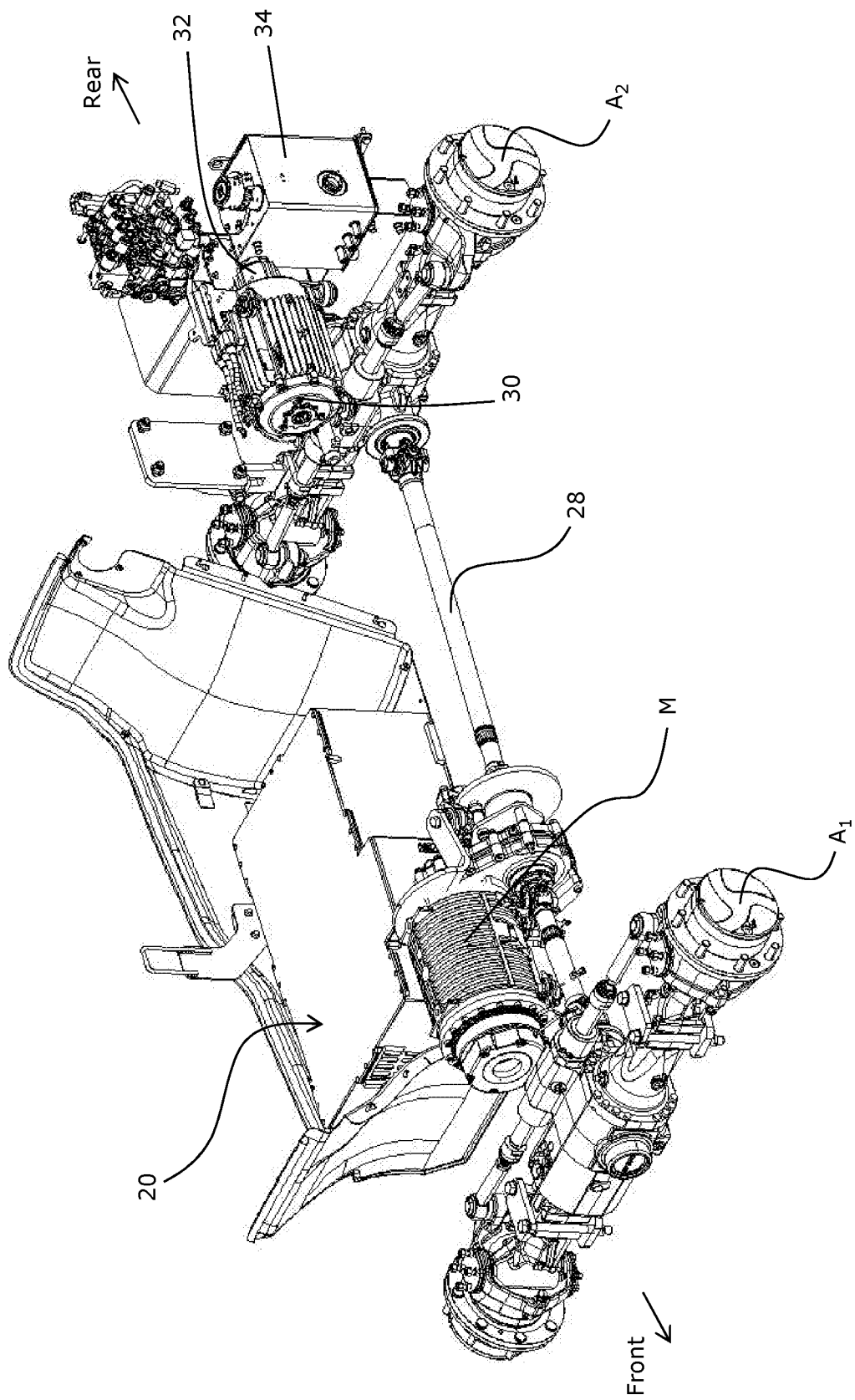
FIG. 2 is an isometric view of a powertrain of the machine of FIG. 1.

With reference to the embodiment of FIG. 2, the working machine 1 is an electric working machine having an electric energy storage unit 20 for providing electrical power to the working machine 1. In this embodiment the electrical energy storage unit comprises batteries, but in other embodiments may utilise capacitors or a combination of batteries and capacitors; or other storage technologies.

In other embodiments the working machine may be a "hybrid" working machine in which an internal combustion engine (ICE) and electric motors may both supply power to the ground engaging propulsion structure and/or the actuators to displace the working arm(s) 6, 7.

As previously described, the working machine 1 includes an electric drive motor M coupled to the electric energy storage unit 20 via suitable control electrics (not shown) and configured to drive movement of one or both pairs of wheels 4, 5. The motor M is coupled to a driveshaft 28 to drive movement of the wheels 4, 5 via axles A1 and A2. The working machine 1 also includes a separate hydraulic pump electric motor 30 configured to drive a hydraulic pump 32 to move the working arms 6, 7, e.g. to actuate the actuators 8, 10. The hydraulic motor 30 is positioned proximal the mount 9 of the load handling apparatus 6, 7. In other embodiments, a single motor may provide drive for traction and actuation of a working arm.

Figure 3:
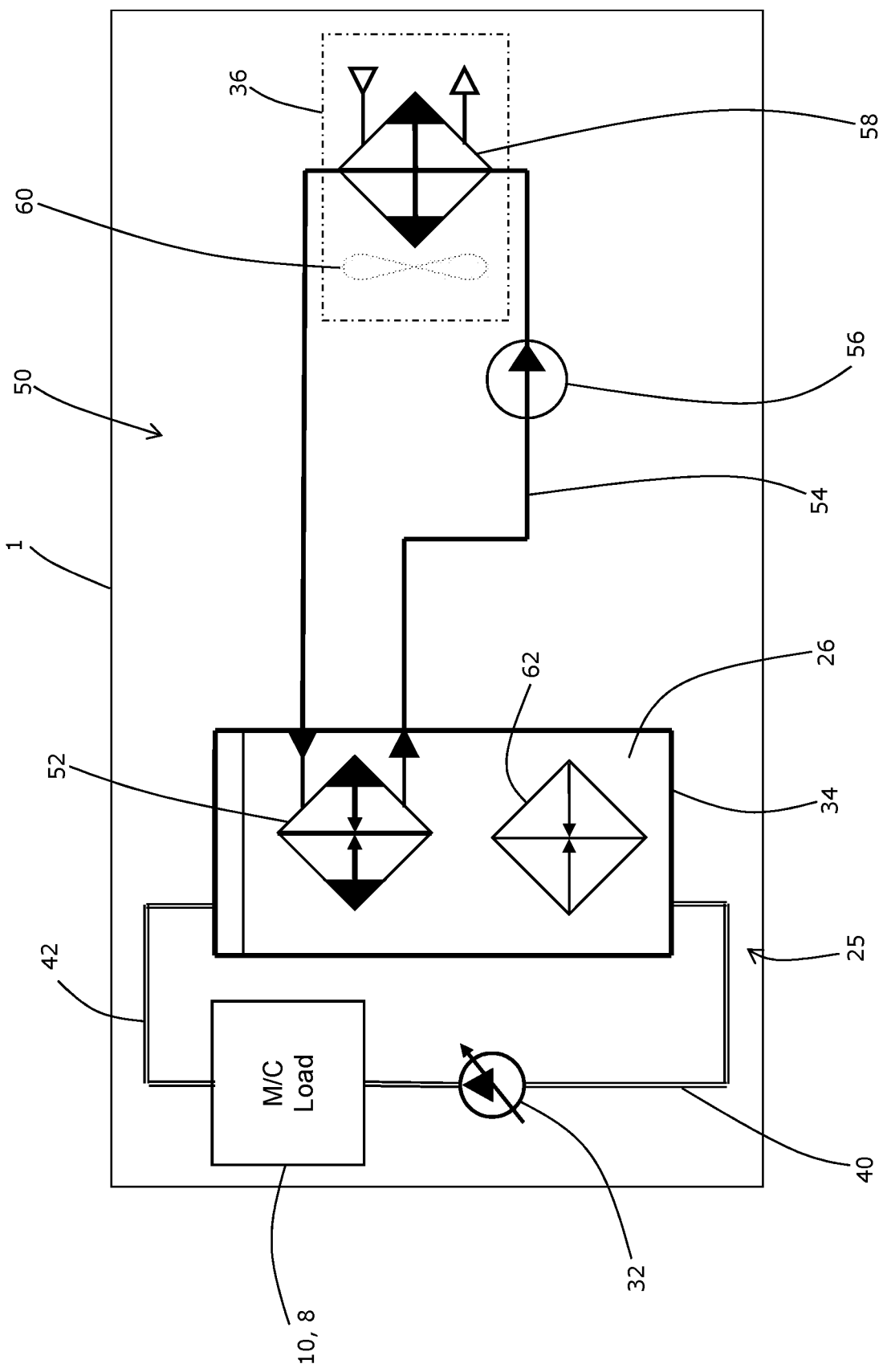
FIG. 3 is a schematic diagram of a thermal management system for the working machine of FIGS. 1 and 2.

Referring now to FIG. 3, a thermal management system 50 of the working machine 1 is illustrated schematically. FIG. 3 also shows schematically the hydraulic fluid circuit 25 in simplified form filled with hydraulic fluid (e.g. without control valves etc.). The hydraulic fluid circuit 25 comprises the hydraulic fluid reservoir 34, supply pipe work 40 to the hydraulic pump 32 and the machine load which in this embodiment comprises the extension actuator 8 and lift actuator 10, as well as other devices in the circuit, which may include an auxiliary circuit to supply hydraulic fluid to an implement mounted to the working arm 6, 7 a power steering actuator and the like. Once the hydraulic fluid has been utilised by these devices it is returned to the reservoir 34 via a return pipework 42.

The thermal management system comprises a liquid/liquid heat exchanger 52 located within the hydraulic fluid reservoir 34 to be immersed within the hydraulic fluid 26. The liquid/liquid heat exchanger 52 is connected to a circuit 54 of the thermal management system 50 that is filled with a suitable working liquid such as ethylene-glycol and that is circulated by means of a coolant pump 56 to a liquid/gas heat exchanger 58 that forms part of the cabin climate control assembly 36. The circuit 54 then returns the coolant to the liquid/liquid heat exchanger 58. The cabin climate control assembly also comprises a fan 60 that blows air over the liquid/gas heat exchanger 58 and through ducts (not shown) into the operator space of the cabin 3.

A heating element 62 is also immersed within the hydraulic fluid 26 in the hydraulic fluid reservoir 34. Both the coolant pump 56 and the heating element 62 are, in this embodiment, electrically powered. Electrical power may be provided either or from an external power source e.g. mains electrical power via a charger (not shown) or from the electrical energy storage unit 20.

It is known that to increase the efficiency of operation of the working arm 6, 7 the hydraulic fluid 26 is desirable to be within an optimal temperature range that is typically above ambient temperature, e.g. a temperature range of 40-60° C. At this temperature, the viscosity of the hydraulic fluid is reduced and therefore frictional losses as it circulates within the circuit 25 are reduced. Additionally, wear on the valves and other components within the circuit 25 may be reduced at this temperature. Temperatures above this range may however cause damage to components in the circuit 25 or sub-optimal performance and this is also undesirable.

When the working machine 1 has been inactive for a period of time (e.g. overnight) in most operating environments, the temperature will be below this desirable range and it will take a period of time for the oil to reach this range (as a result of frictional effects as it circulates) dependent upon ambient temperatures and the intensity with which the machine is operated. In the intervening period, the operational efficiency of the machine is reduced. In some circumstances where the working arms are not operated intensively, the temperature may not achieve the desired range. Further, if the machine has been operating intensively for an extended period of time it is possible that the hydraulic fluid exceeds the desirable temperature range, which may also be undesirable for the reasons stated above.

However, the present inventors have recognised that at the same time, there may be a demand for heat to be supplied to the operator cabin to improve operator comfort. The present inventors have recognised that the usage of electrical power supplied from the electrical energy storage unit 20 in such circumstances makes inefficient usage of this limited resource when a supply of heat energy may already be available from the hydraulic fluid 26.

Accordingly, in such circumstances the thermal management system 50 enables the coolant to be circulated around the circuit 54, drawing heat from the hydraulic fluid 26 in the reservoir 34 and supplying it to the liquid/gas heat exchanger 58 in the cabin climate control assembly 36. Although electrical power is required to run the coolant pump 56, this requirement is significantly lower than the energy required to heat an electrical heating element specifically to heat the cabin 3. As a result, the thermal management system 50 may simultaneously enable the hydraulic fluid to be kept within a desirable operating temperature range and also maintain the cabin temperature at a desirable level for an operator.

In order to raise the temperature of the hydraulic fluid 26 to the desirable operating range after an extended period where the working machine 1 is inoperative, the heating element 62 may be used to pre-heat the hydraulic fluid 26. Whilst the heating element 62 is electrically powered, such pre-heating may occur whilst the working machine 1 is placed onto charge overnight. This means that the electrical power is not supplied from the electrical energy storage unit 20 on the working machine, which would otherwise reduce the electrical energy available to the working machine for performing working operations.

In addition, if the hydraulic fluid 26 is pre-heated at the very start of operation, or prior to the start of operation of the working machine 1, this means that the heat energy of the hydraulic fluid 26 can be used to supply heat to the cabin 3 straight away, or at least with a much reduced delay. Indeed, if low outside air temperatures are anticipated for a particular working day, the heating element 62 may be controlled in such a way as to heat the hydraulic fluid to a higher temperature than may otherwise be required in anticipation of some of said heat being supplied to the cabin climate control assembly 36 immediately upon vehicle operation or to preheat the cabin 3 before the operator enters it.

In an alternative embodiment, the liquid/liquid heat exchanger 52 may be placed in the return pipe work 42 rather than within the hydraulic fluid reservoir 44. Such an arrangement may still allow heat to be efficiently recovered from the hydraulic fluid 26.

Figure 4:
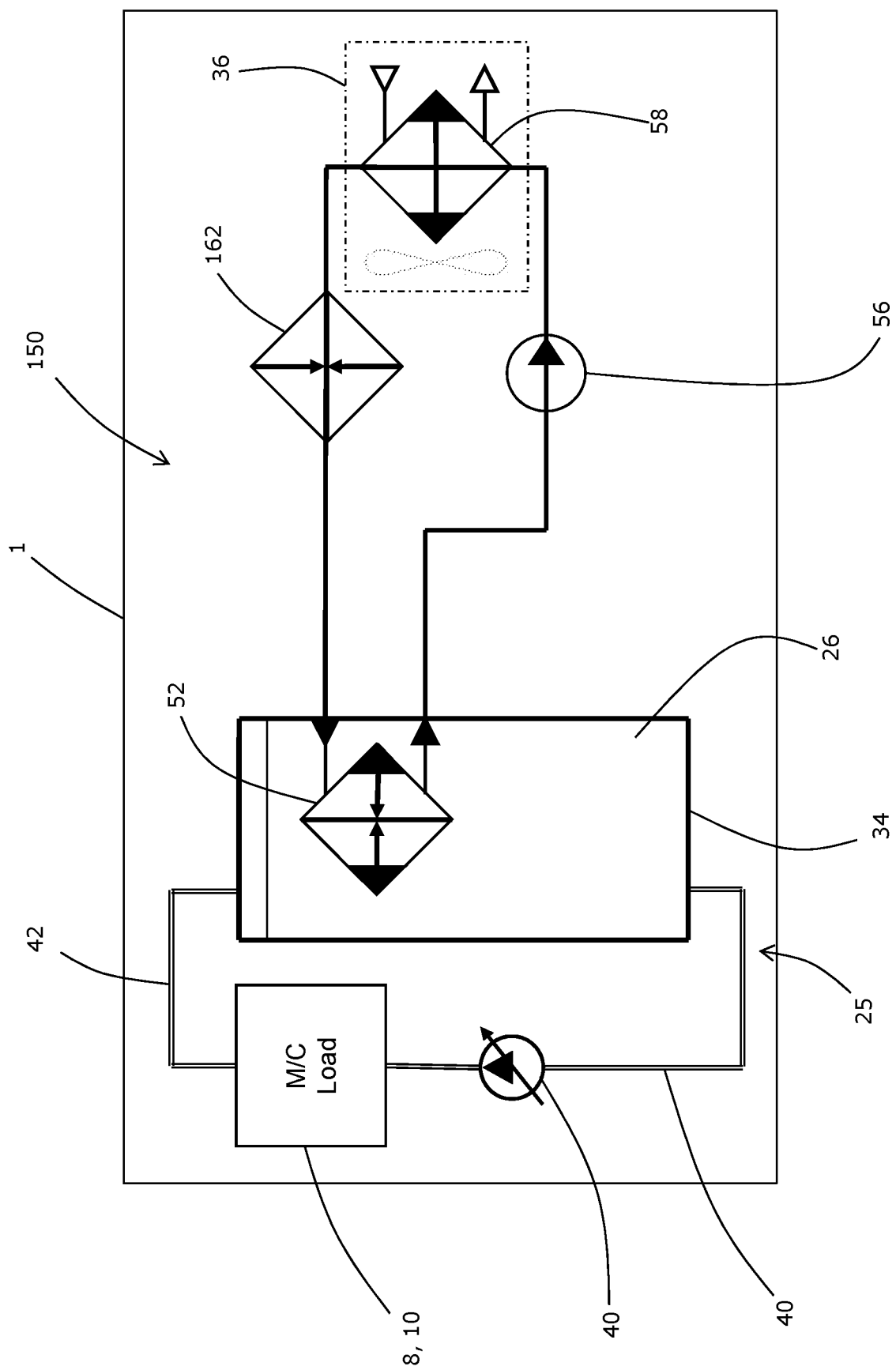
FIG. 4 is a schematic diagram of another embodiment of a thermal management system for the working machine of FIGS. 1 and 2.

With reference to FIG. 4 a variant of the thermal management system of FIG. 3 is illustrated and denoted by the reference 150. This embodiment differs in that the heating element 162 is positioned so as to heat the coolant within the circuit 54 of the thermal management system 150. Ethylene-glycol and other similar coolant fluids have a specific heat capacity that is greater than that of hydraulic fluid, in the case of ethylene-glycol approximately 40% more. Accordingly, in certain machine installations it may be advantageous to provide the heat energy to the coolant since a greater amount of energy can thereby be held within the system when it is pre-heated. In other respects, the thermal management system 50 prime operates in a similar way to that of the first embodiment.

Figure 5:
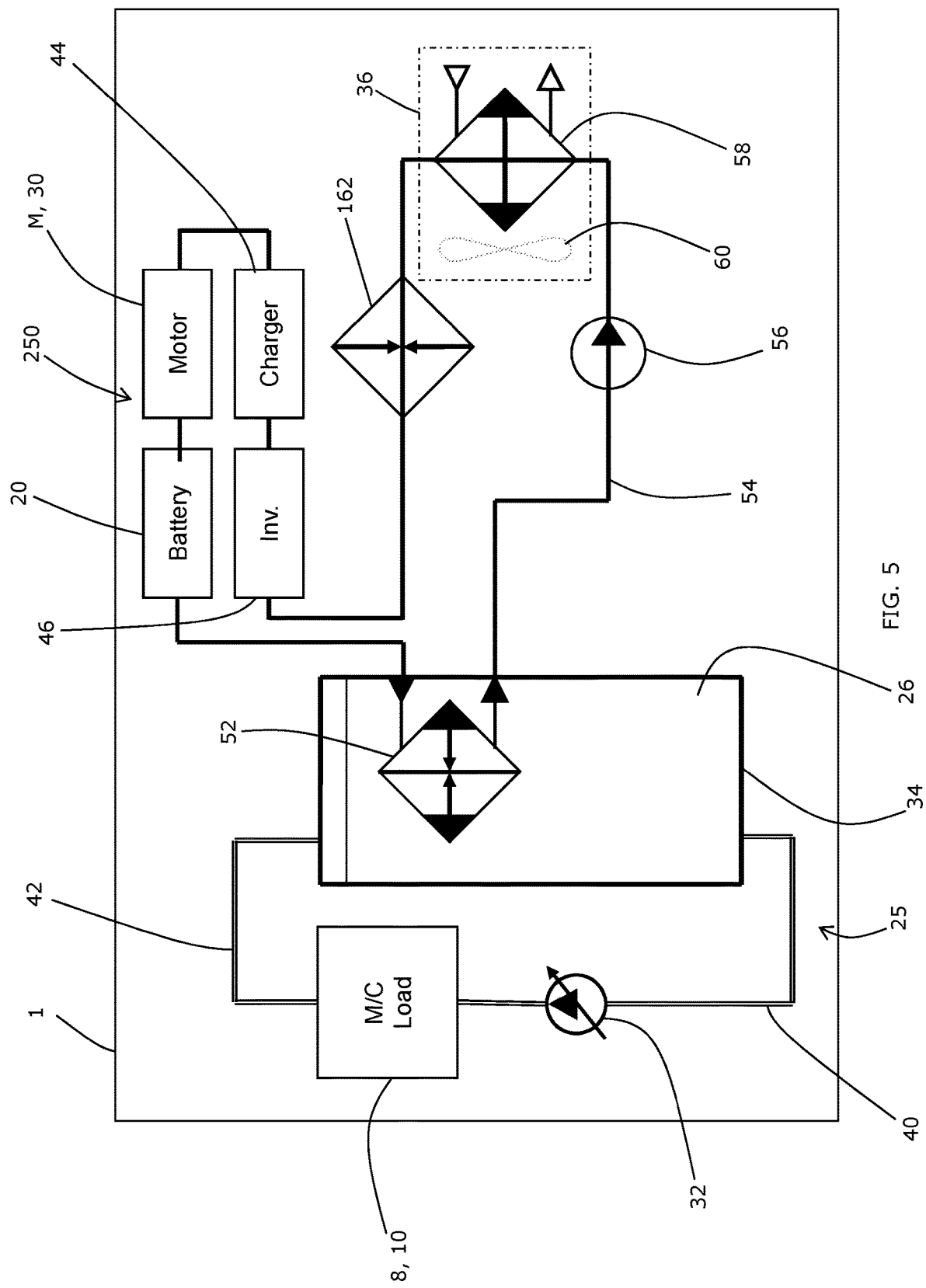
FIG. 5 is a schematic diagram of a still further embodiment of a thermal management system for the working machine of FIGS. 1 and 2.

FIG. 5 illustrates a further embodiment of the present teachings in which further components of the working machine 1, namely power electronics components such as the electrical energy storage unit 20, motors M, 30, a charger 44 and an AC/DC inverter 46 are also included within the thermal management system 250.

Again, these components either operate at an improved efficiency within a particular temperature range, or risk damage by being operated at a temperature above an upper limit.

For example, the present inventors have found that the batteries of the electrical energy storage unit 20 of the present embodiment operate optimally at a temperature range of around 20-30° C. and if the temperature exceeds 60° C. operation of the machine will be stopped since this would otherwise risk the safe usage thereof. The electric motors M and 30 may suffer temporary or permanent damage if operated above around 120-130° C. for example. As such, the inclusion within the circuit 54 downstream of the heating element 162 and upstream of the liquid/liquid heat exchanger 52 means that the heating element 162 may be utilised to condition or pre-heat the battery 20 when the machine is utilised in cold climates, but also may allow heat energy to be withdrawn from these components if they are above a desirable operating temperature. It will be appreciated that in other embodiments alternative batteries with different chemistries or other energy storage technologies may be utilised and therefore the optimal temperature ranges and upper safety limits may differ, but that heating or cooling of the energy storage unit may still be required, albeit to meet these different temperature requirements.

Whilst the components are illustrated in series in FIG. 5 and in a particular order, it will be appreciated that the order of these components may be altered so as to optimise the heat transfer from one component to another. Alternatively, each of the components may be provided in parallel rather than in series with a suitable valve arrangement to allow the coolant to flow past that particular component if heating or cooling is required or to bypass that component if it is within a suitable operating temperature range.

Figure 6:
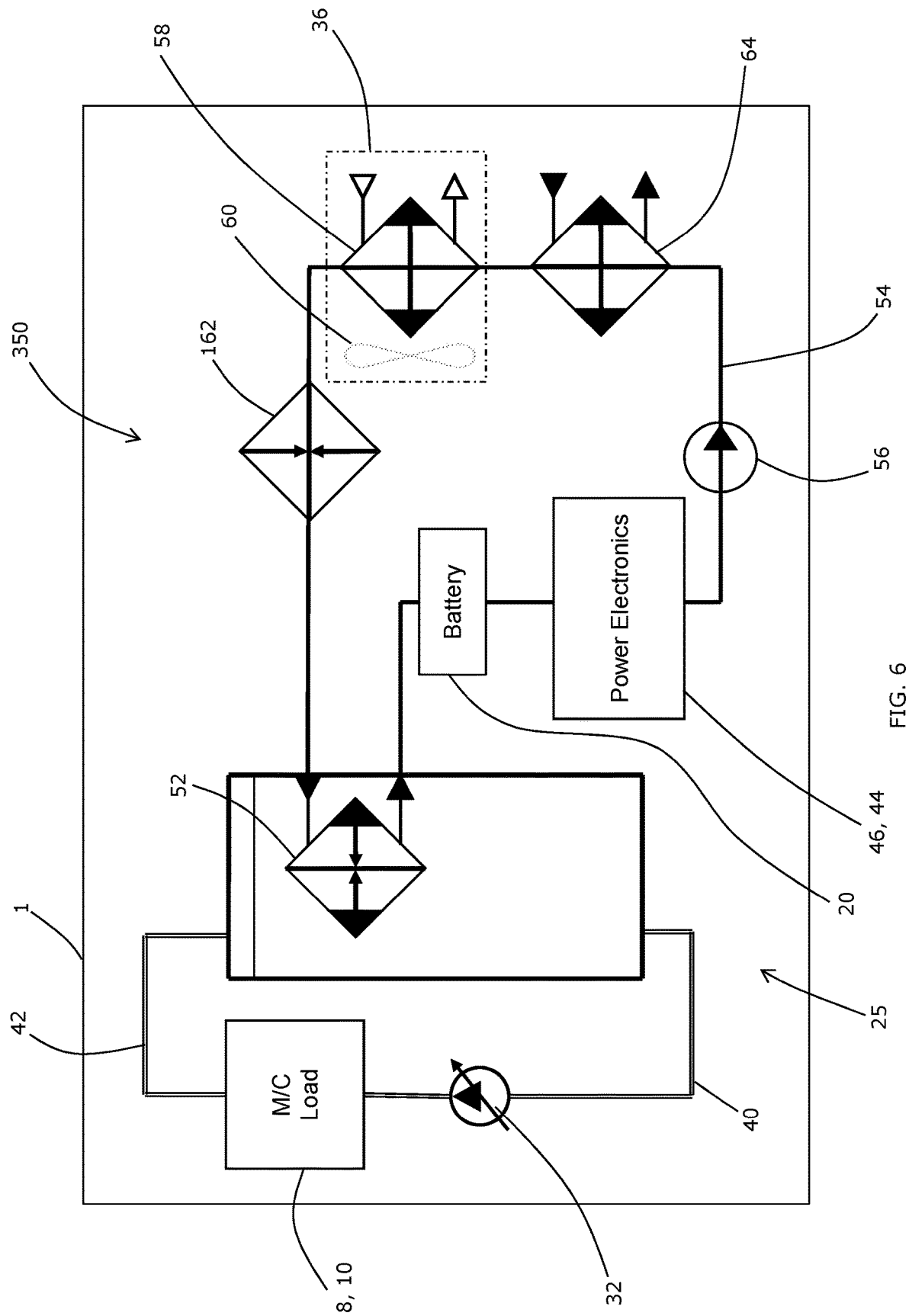
FIG. 6 is a schematic diagram of another embodiment of a thermal management system for the working machine of FIGS. 1 and 2.

FIG. 6 illustrates another embodiment of the thermal management system denoted 350. In this embodiment, the battery 20 and the power electronics 44, 46 are located downstream of the liquid/liquid heat exchanger 52 but notably the thermal management system 350 further includes an auxiliary heat exchanger 64 in series with the liquid/gas heat exchanger 58 of the cabin climate control assembly 36. In this embodiment the auxiliary heat exchanger 64 is a further liquid/liquid heat exchanger and is supplied with chilled coolant. For example, the coolant may be supplied from a separate cooling circuit (not shown). This permits the cooling of the hydraulic fluid 26 and optionally the battery 20 and power electronics 44, 46 to occur even if heating of the cabin 3 is not required. Ultimately, the heat is expelled to the surroundings of the working machine.

In other embodiments, the liquid/liquid auxiliary heat exchanger 64 may be replaced by a liquid/gas heat exchanger e.g. as part of the outside heat exchanger assembly 38 depicted in FIG. 1. To improve the heat transfer such a liquid/gas heat exchanger may be associated with a fan.

FIGS. 7-10 illustrate a further embodiment of the thermal management system denoted 450 which is more complex than that of the embodiment of FIGS. 3-6. Specifically, the thermal management system of this embodiment uses a heat pump arrangement coupled to separate cooling 476 and heating 478 coolant circuits that use valves to selectively switch heat exchange's into either the cooling or the heating circuit. However, the principle of utilising the hydraulic fluid as a possible medium for storing heat energy remains.

In this embodiment the thermal management system utilises a Carnot cycle heat pump. This is beneficial as it provides both sensible and latent heat transfer. The heat pump comprises a refrigerant circuit 466 that has a compressor 468 in series with a condenser 470, expansion device 472 and evaporator 474. The circuit 466 is a closed loop and contains a suitable refrigerant such as R134a or R1234yf.

The thermal management system 450 also includes the cooling circuit 476 and the heating circuit 478. A heat transfer fluid or coolant such as water-ethylene-glycol mix may be used in both the heating and cooling circuit 476, 478. Both the heating and cooling circuits comprise pumps 456a and 456b to circulate the coolant around the circuit.

The cooling circuit 476 is connected to the evaporator 474 and the heating circuit 478 is connected to the condenser 470 such that heat energy may be transferred from the cooling circuit to the heating circuit via the refrigerant circuit 466.

The cooling circuit 476 is selectively connected to a cabin cooler heat exchanger 480 via a flow control valve 482. The cooling circuit is also connected to an outside heat exchanger 464 by first and second three way flow control valve arrangements 484a and 484b. Finally, the cooling circuit 476 is connected to the hydraulic oil heat exchanger 452 via two further three way flow control valve arrangements 486a and 486b. The third port of the three way flow control valve arrangements 484a, 484b, 486a and 486b are connected to the heating circuit 478 such that the three way flow control valve arrangements can switch to the flow of either the cooling circuit 476 or heating circuit 478 as is required.

The heating circuit 478 is also selectively connected to a cabin heater 458 via a further flow control valve 488. The cabin cooler 480 and heater 458 are both, in this embodiment, provided as part of a cabin climate control assembly 436 that also includes a fan 460 that blows outside air past both the cabin cooler and cabin heater 480 and 458 and into the cabin via suitable vents in order to provide for cabin heating or cooling as required. The cabin climate control assembly 436 also allows air within the cabin to be recirculated through the cabin cooler 480 or heater 458 in certain embodiments.

As in the previous embodiments the thermal management system 450 seeks to attain a temperature of hydraulic fluid that is within the desirable temperature range to achieve an optimal viscosity whilst also providing a comfortable environment in the cabin 3 for the operator, without undue use of electrical power from the electrical energy storage unit 20.

In FIGS. 7-10 the flow of heated coolant in the heating circuit 478 is denoted by a thick solid line whereas an inoperative part of the heating circuit is denoted by dotted lines. The flow of coolant in the cooling circuit is denoted by a solid thin line, whereas inoperative parts of the coolant circuit are also denoted by broken lines.

Figure 7:
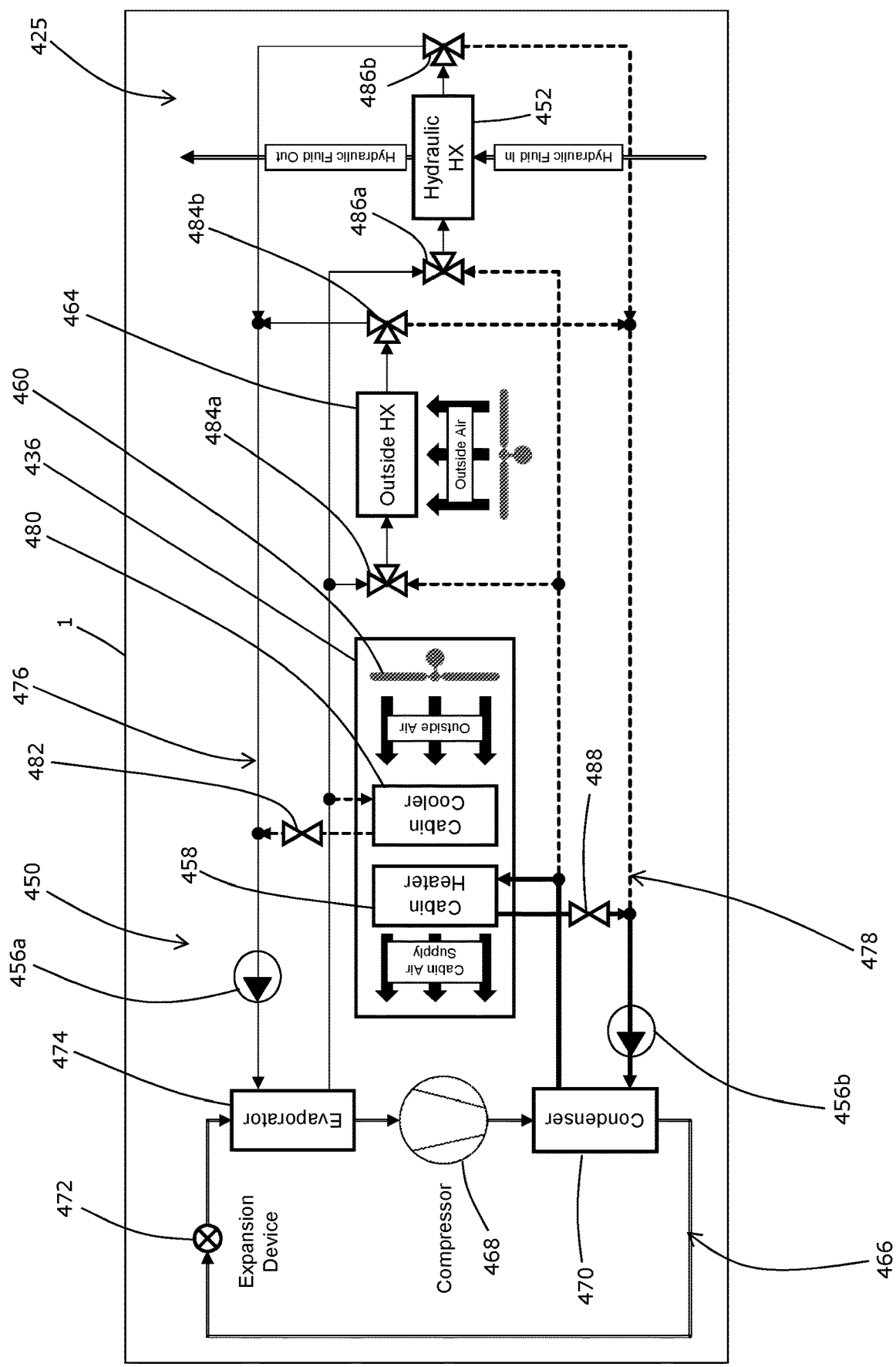
FIG. 7 is a schematic diagram of a still further embodiment of a thermal management system for the working machine of FIGS. 1 and 2 shown in a first mode of operation.

In FIG. 7 the thermal management system 450 is operating with heat energy being absorbed by the refrigerant circuit 466 via the following heat transfer process: Heat energy in the hydraulic fluid flowing in the hydraulic flowing circuit 425 is transferred to the cooling circuit 476 via the hydraulic oil heat exchanger 452 and from ambient air via the outside heat exchanger 464. This heat energy is then transferred from the cooling circuit 476 to the refrigerant circuit 466 via the evaporator 474 and the refrigerant circuit then transfers this heat to the cabin heater via the condenser 470 and the heating circuit 478. The fan 460 blows outside air over the cabin heater 458 to raise the temperature within the cabin 3. It can be seen that the flow control valve 482 is closed so that the cabin cooler 480 is inoperative.

In order to maintain the desired viscosity of the hydraulic fluid, the rate of coolant flow through the hydraulic oil heat exchanger 452 is metered to control the rate of heat rejection from the hydraulic fluid, with any shortfall in the heat required to be transferred to the cabin heater being supplied by the outside heat exchanger 464.

Figure 8:
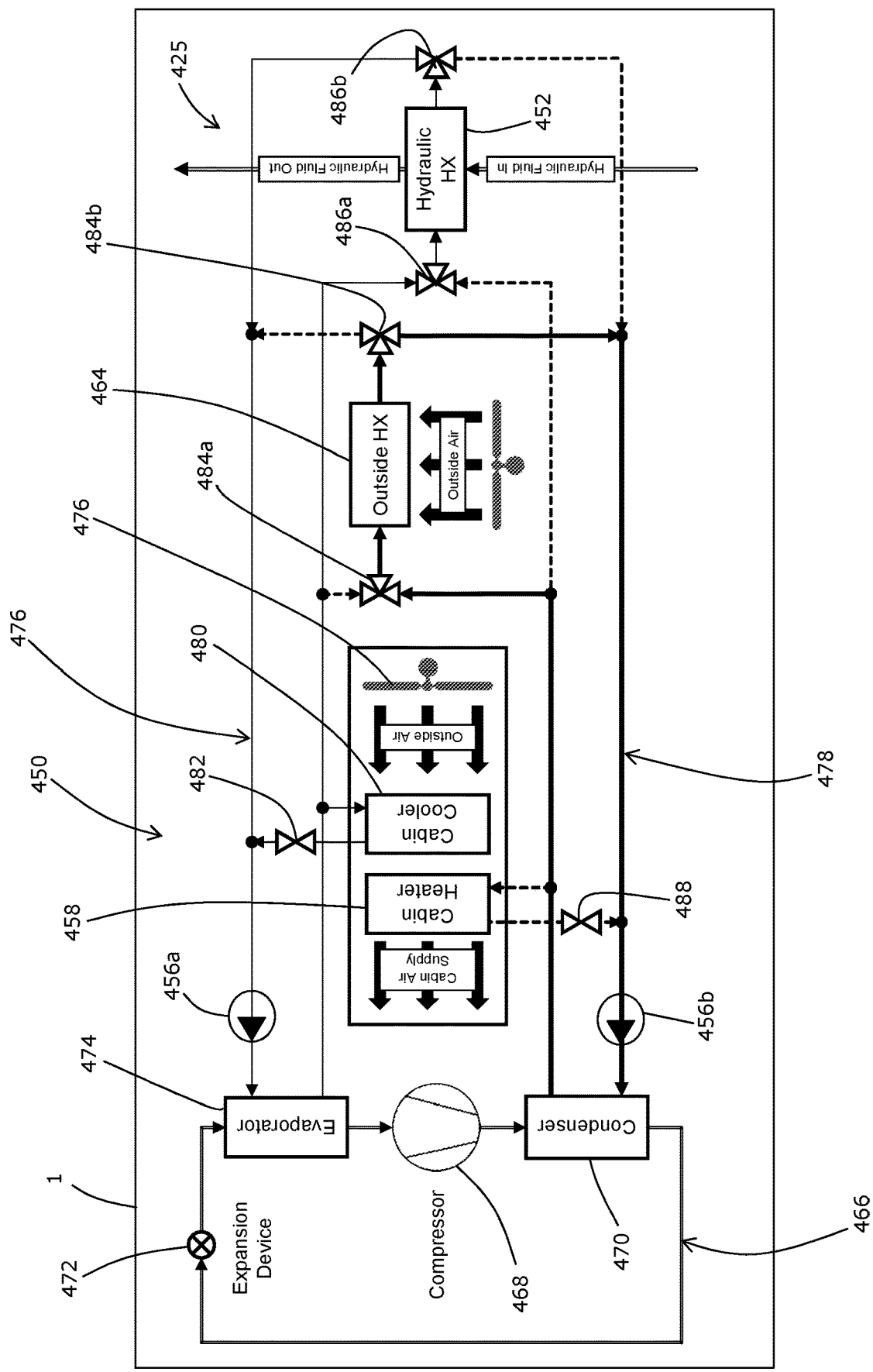
FIGS. 8, 9 and 10 illustrate the thermal management system of FIG. 7 in differing modes of operation.

FIG. 8 illustrates the thermal management system 450 operating in a different mode which reflects a situation in which the working machine is operating in a high ambient temperature and the hydraulic fluid and the cabin simultaneously require cooling. Accordingly, in this situation heat energy is absorbed by the refrigerant circuit 466 via the transfer of heat energy from the hydraulic fluid in the hydraulic fluid circuit 425 to the refrigerant circuit via the cooling circuit 476 and evaporator 474. Simultaneously, heat energy is also transferred from the cabin to the evaporator 474 via the cabin cooler 480. This heat energy is then rejected to the outside air from the refrigerant circuit 466 via the condenser 470 and outside heat exchanger 464, as the three way flow control valve arrangements 484a and 484b are now switched to allow flow of coolant in the heating circuit 478 through the outside heat exchanger 464. Again, the temperature of the hydraulic fluid is maintained within its target temperature range by metering the rate of coolant flow through the hydraulic oil heat exchanger 452.

Figure 9:
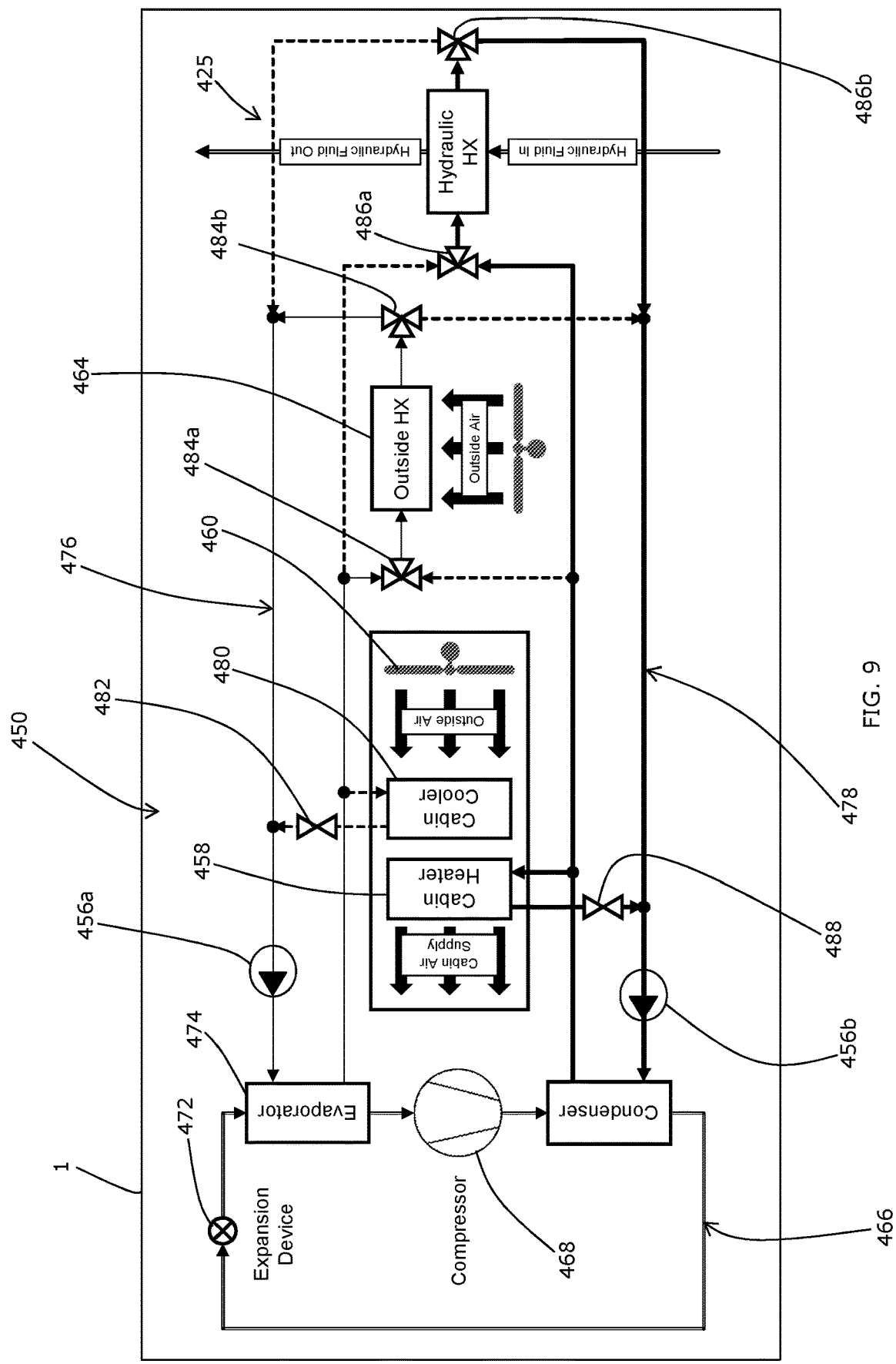

Referring to FIG. 9, the thermal management system is operating in a mode to reflect a situation where, for example, a pre conditioning of the hydraulic fluid and cabin air temperature is required before operation of the working machine 1, or the working machine has just started operating from a cold start and the operator requires the cabin 3 to be heated and at the same time the hydraulic oil in the hydraulic circuit 425 is lower than the target temperature range. Consequently, heat energy is absorbed by the refrigerant circuit 466 via a heat transfer process that takes heat energy from the outside air to the cooling circuit 476 via the outside heat exchanger 464 and then into the refrigerant circuit 466 via the evaporator 474.

This heat energy is then transferred to the hydraulic fluid in the hydraulic fluid circuit 425 and to the cabin 3 via the refrigerant circuit 466 to the condenser 470 and then into the heating circuit 478 which has its flow control valves set to allow the flow of heated coolant into both the cabin heater 458 and the hydraulic oil heat exchanger 452.

Figure 10:
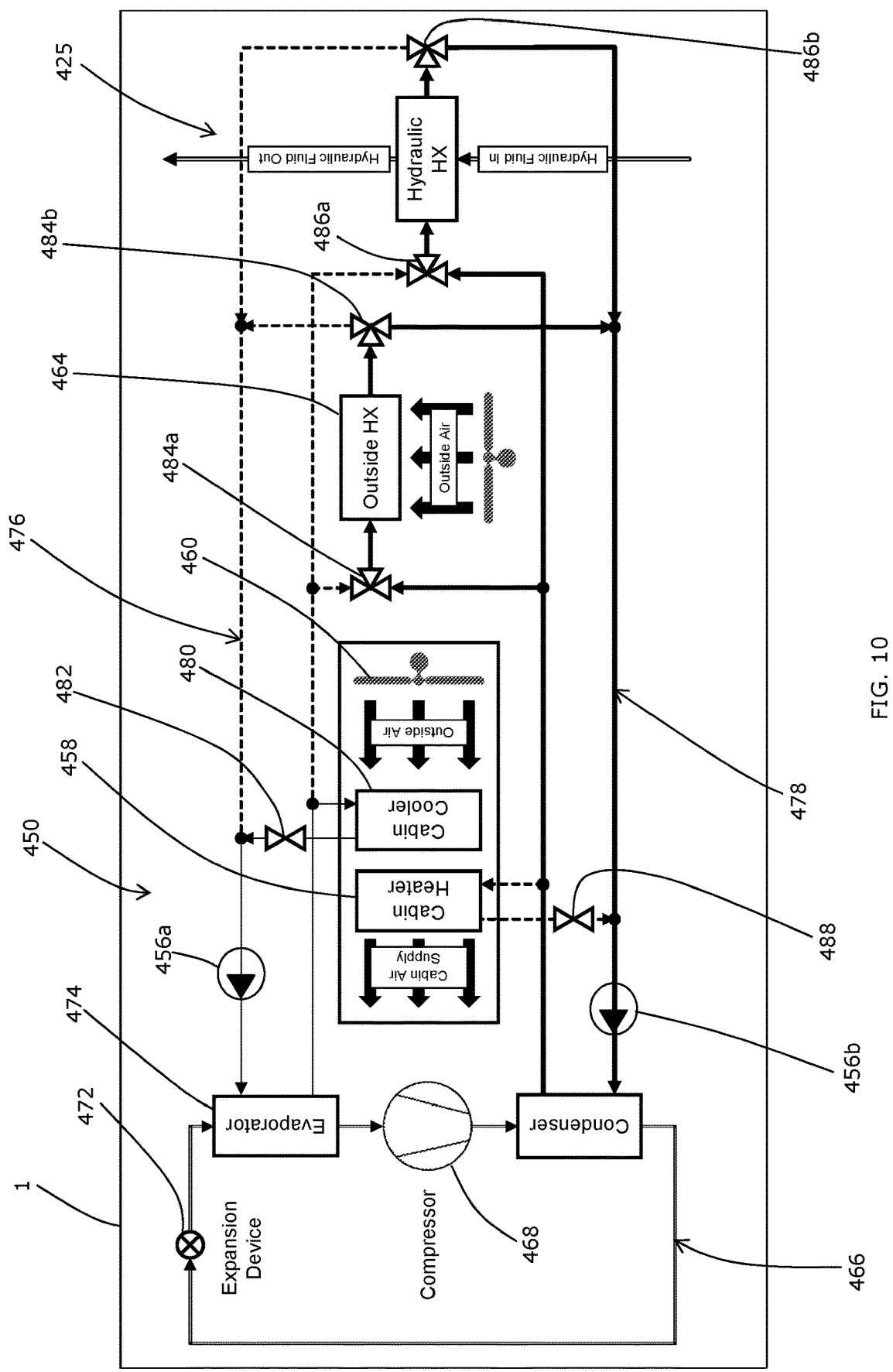

Finally, with reference to FIG. 10 the thermal management system 450 is set to reflect a situation where the ambient temperature is relatively warm and the operator has requested cooling within the cabin 3 and simultaneously the machine 1 is operating on a light duty cycle such that the natural frictional losses due to flow of hydraulic fluid around the hydraulic fluid circuit 425 is not capable of maintaining the temperature of the hydraulic fluid at the desirable temperature range and therefore some heating of the hydraulic oil is also required.

Accordingly, heat energy is absorbed by the refrigerant circuit 466 via the cabin air to the cooling circuit via the cabin cooler 480 and to the refrigerant circuit 466 via the cooling circuit 476 and evaporator 474. This heat energy is then rejected to the hydraulic fluid and to the outside air by way of its transfer to the condenser via the refrigerant circuit 466 and from the condenser to the heating circuit 478 and then into both the hydraulic oil heat exchanger 452 and the outside heat exchanger 464. The rate of flow of heated coolant into the hydraulic oil heat exchanger may be metered to ensure the temperature of the hydraulic oil is maintained within the target temperature range, with the remaining flow and excess heat energy being expelled to the outside air via the outside heat exchanger 464.

It can therefore be appreciated that the thermal management system 450 may be switched via the opening and closing of the flow control valves to efficiently provide and remove heat energy to the cabin 3 and or the hydraulic fluid circuit 425 as required and to remove heat energy from the cabin 3 and the hydraulic fluid circuit 425 as required, thereby ensuring a pleasant environment for the working machine operator and the hydraulic fluid being utilised within the desirable temperature range for efficient movement of the working arm 6, 7.

It will be appreciated that the thermal management system may also be adapted to supply or remove heat energy to the batteries and power electronics by adding the suitable further valves and heat exchange's to the system of FIGS. 7-10. In other embodiments other forms of heat pumps may be utilized such as magnets—Caloric, Peltier, Baro-Caloric, Elasto-Caloric and Electro-Caloric.

The invention claimed is:

1. A working machine comprising;
   a hydraulic fluid circuit arranged to provide hydraulic fluid to one or more hydraulic actuators to perform a working operation;
   a ground engaging propulsion structure;
   an electrical energy storage device configured to provide, electrical energy to an electric motor to provide, at least in part, tractive power to the ground engaging propulsion structure and power to a hydraulic pump to provide pressurised hydraulic fluid to displace the or each hydraulic actuator;
   an operator structure;
   an operator structure heater arranged to supply heat energy to selectively warm the operator structure and an operator structure cooler arranged to remove heat energy to selectively cool the operator structure;
   a heat exchanger arranged to selectively supply and remove heat energy to/from the hydraulic fluid circuit; and
   a thermal management system connecting the heat exchanger to the operator structure heater to transfer heat from the hydraulic fluid to the operator structure heater; and
   wherein the thermal management system is configured to preheat at least one or both of the operator structure and the hydraulic fluid to a target temperature prior to operation of the working machine.

2. The working machine of claim 1, wherein the thermal management system is configured to selectively transfer heat from the operator structure to the hydraulic fluid.

3. The working machine of claim 1, wherein the thermal management system is configured to be active when the working machine is charging.

4. The working machine of claim 1, wherein the thermal management system comprises a hydraulic fluid heat exchanger immersed in the hydraulic fluid.

5. The working machine of claim 4 where the hydraulic fluid heat exchanger is a liquid/liquid heat exchanger.

6. The working machine of claim 1 wherein the operator structure heater is a liquid/gas heat exchanger.

7. The working machine of claim 1, wherein the thermal management system is configured to selectively supply heat energy to and remove heat energy from the hydraulic fluid.

8. The working machine of claim 1, wherein the thermal management system is configured to selectively supply heat energy to and remove heat energy from the operator structure.

9. The working machine of claim 1, wherein the thermal management system is arranged to supply heat energy to and remove heat energy from at least one of: an electric motor to provide tractive power to the ground engaging structure, an electric motor to drive a hydraulic pump of the hydraulic fluid circuit, power electronics of the working machine; and the electrical energy storage device.

10. The working machine of claim 1, comprising a hydraulic fluid heater arranged so as to supply heat energy to the hydraulic fluid prior to operation of the working machine.

11. The working machine of claim 1, comprising an electric heater arranged to supply heat energy to the thermal management system to pre-heat the hydraulic fluid and/or operator structure.

12. The working machine of claim 1, comprising a device to direct excess heat energy to atmosphere and liberate heat energy from atmosphere.

13. The working machine of claim 1, wherein the thermal management system comprises a heat pump circuit.

14. The working machine of claim 13, wherein the heat pump circuit comprises a compressor, an expansion device, an evaporator and a condenser, and wherein the thermal management system comprises a selectable cooling circuit connected to the evaporator and wherein the thermal management system comprises a selectable heating circuit connected to the condenser.

15. The working machine of claim 14, comprising a valve arranged in the cooling and heating circuits to selectively switch between operator structure heating and operator structure cooling.

16. The working machine of claim 14, comprising a valve arranged in the cooling and heating circuits to selectively switch between hydraulic fluid heating and hydraulic fluid cooling.

17. The working machine of claim 14, comprising an outside air heat exchanger and further comprising a valve arranged in the cooling and heating circuits to selectively switch the outside heat exchanger between heat energy absorption and heat energy rejection.

18. The working machine of claim 1, wherein the thermal management system is configured to overheat the hydraulic fluid when it is determined that an ambient temperature is below a predetermined ambient temperature threshold and to transfer heat energy from the hydraulic fluid to the operator structure climate control assembly to heat the operator structure.

19. The working machine of claim 1, wherein the thermal management system is configured to selectively transfer thermal energy between the operator structure and the hydraulic fluid to heat the hydraulic fluid to obtain a predetermined hydraulic fluid viscosity.

20. A working machine comprising;
a hydraulic fluid circuit arranged to provide hydraulic fluid to one or more hydraulic actuators to perform a working operation;
a ground engaging propulsion structure;
an electrical energy storage device configured to provide, electrical energy to an electric motor to provide, at least in part, tractive power to the ground engaging propulsion structure and power to a hydraulic pump to provide pressurised hydraulic fluid to displace the or each hydraulic actuator;
an operator structure;
an operator structure heater arranged to supply heat energy to selectively warm the operator structure and an operator structure cooler arranged to remove heat energy to selectively cool the operator structure;
a heat exchanger arranged to selectively supply and remove heat energy to/from the hydraulic fluid circuit;
a thermal management system connecting the heat exchanger to the operator structure heater to transfer heat from the hydraulic fluid to the operator structure heater, wherein the thermal management system comprises:
a heat pump circuit including a condenser, an expansion device, a compressor and an evaporator;
a selectable cooling circuit connected to the evaporator;
a selectable heating circuit connected to the condenser; and
a valve arranged in the cooling and heating circuits to selectively switch between operator structure heating and operator structure cooling.

21. A working machine comprising;
a hydraulic fluid circuit arranged to provide hydraulic fluid to one or more hydraulic actuators to perform a working operation;
a ground engaging propulsion structure;
an electrical energy storage device configured to provide, electrical energy to an electric motor to provide, at least in part, tractive power to the ground engaging propulsion structure and power to a hydraulic pump to provide pressurised hydraulic fluid to displace the or each hydraulic actuator;
an operator structure;
an operator structure heater arranged to supply heat energy to selectively warm the operator structure and an operator structure cooler arranged to remove heat energy to selectively cool the operator structure;
a heat exchanger arranged to selectively supply and remove heat energy to/from the hydraulic fluid circuit;
a thermal management system connecting the heat exchanger to the operator structure heater to transfer heat from the hydraulic fluid to the operator structure heater, wherein the thermal management system comprises:
a heat pump circuit including a condenser, an evaporator, and a compressor;
a selectable cooling circuit connected to the evaporator; and
a selectable heating circuit connected to the condenser; and
a valve arranged in the cooling and heating circuits to selectively switch between hydraulic fluid heating and hydraulic fluid cooling.

* * * * *